O. T. BEDELL.
Sound-Deadener for Car-Trucks.

No. 227,205. Patented May 4, 1880.

Witnesses:
Fred Haynes
Edwin H. Brown

Inventor:
Otis T. Bedell
by his Attorneys
Brown & Brown

United States Patent Office.

OTIS T. BEDELL, OF NEW YORK, N. Y.

SOUND-DEADENER FOR CAR-TRUCKS.

SPECIFICATION forming part of Letters Patent No. 227,205, dated May 4, 1880.

Application filed October 15, 1879.

*To all whom it may concern:*

Be it known that I, OTIS T. BEDELL, of the city of New York, in the county and State of New York, have invented certain new and useful improvements in devices attached to railway cars or locomotives for lessening noise and drying the rails of elevated and other railways, of which the following is a specification.

My invention consists in the combination, in a locomotive or railway car or truck, with the supporting-wheels which sustain the weight of the locomotive or car, of wheels or rollers the peripheries of which are composed of rubber or other elastic or yielding material of similar nature resting upon the rails and adapted to be rotated by contact therewith. The vibrations of the track-rails incident to the passage of a locomotive or car over them are checked by the non-conducting rubber-covered wheels or rollers, and the pressure of the latter upon the track serves to squeeze the water off the top of the rails and dry the same.

Figure 1:
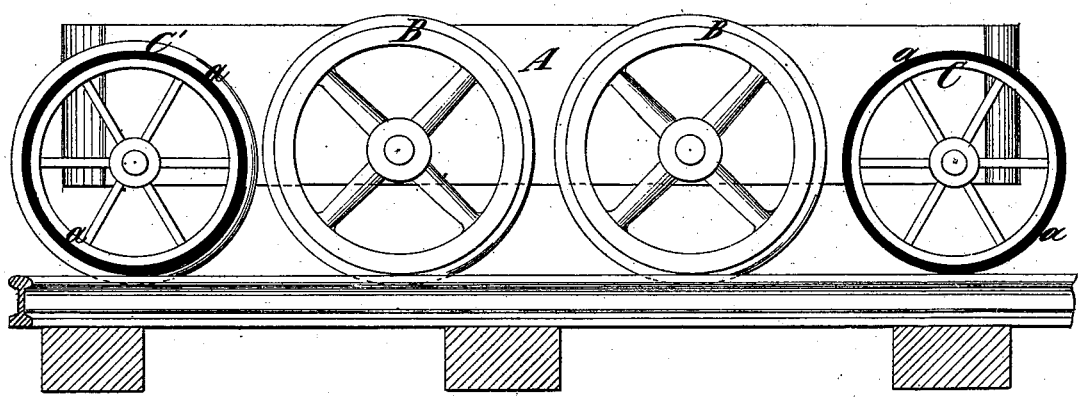
Figure 2:
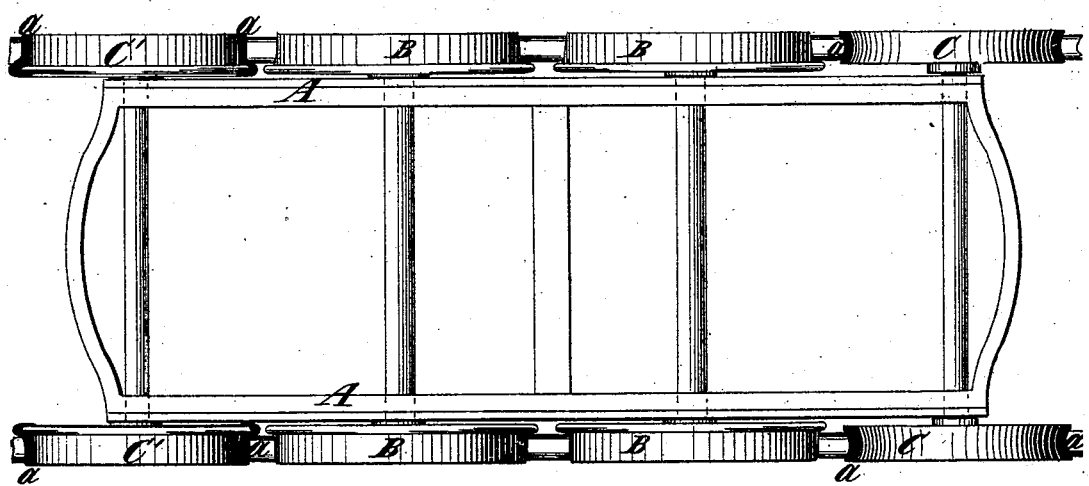

In the accompanying drawings, Figure 1 represents a side view of a railway-truck embodying my invention, and Fig. 2 represents a plan thereof.

Similar letters of reference designate corresponding parts in both figures.

A designates a railway-truck, which may be of any ordinary construction, and B designates supporting-wheels, of which two pairs are here represented. These might be the leading-wheels on a locomotive-truck or the wheels of an ordinary railway-car truck. Their construction and arrangement are wholly immaterial.

C C' designate other wheels or rollers, the axles of which are supported by the truck, and which rest upon the rails, but support little or none of the weight of the truck and car. If desirable, the axles of these wheels might be held in vertically-adjustable bearings in the truck, so that the wheels will rest on the rails with only their own weight and the weight of the axle, and springs might be employed to increase the pressure of the wheels C on the rails. Screws or other means might be employed for increasing or diminishing the pressure exerted by said springs.

In some cases each wheel may be independently arranged after the manner of a caster.

The wheels C C' are here represented as made of iron, provided with thick rims or tires a, of rubber or other elastic material which is a non-conductor of sound; but the wheels might be made wholly of non-conducting or poor conducting material, or wholly of rubber or of wood covered with rubber.

The wheels may be without flanges and have concave or grooved peripheries, like the wheels C, or they may have flanges like the wheels C', in which case the rubber tire or rim should cover the whole flange, as represented in the wheels C'.

Two wheels only might be used, in which case they would be preferably arranged at the front of the truck in advance of the supporting-wheels; but they might be arranged between or in the rear of the supporting-wheels. As here represented, a pair of wheels are arranged on each side of the supporting-wheels B, thus isolating a portion of the track and preventing the vibrations from extending in either direction.

The weight of the wheels C C' and their axles is sufficient to compress the rubber tires or rims, and thus squeeze or drive off any water on the top of the rails.

What I claim as my invention, and desire to secure by Letters Patent, is—

1. The combination, in a locomotive or railway car or truck, with the supporting-wheels which sustain the weight of the locomotive or car, of wheels or rollers the peripheries of which are composed of rubber or other elastic or yielding material of similar nature resting upon the rails and adapted to be rotated by contact therewith, substantially as specified.

2. The combination, in a locomotive or railway car or truck, with the supporting-wheels which sustain the weight of the locomotive or car, of wheels or rollers arranged at opposite ends of the car or truck on both sides of said supporting-wheels, and having peripheries composed of rubber or other elastic or yielding material of a similar nature, the said wheels or rollers resting upon the rails and adapted to be rotated by contact therewith, substantially as specified.

OTIS T. BEDELL.

Witnesses:
HENRY T. BROWN,
E. P. JESSUP.